E. G. K. ANDERSON.
EXTENSION ELECTRICAL FIXTURE.
APPLICATION FILED JULY 13, 1914.
1,175,498.
Patented Mar. 14, 1916.
2 SHEETS—SHEET 1.
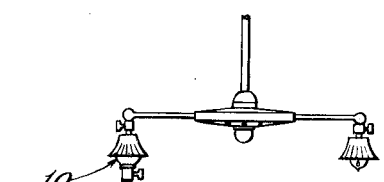
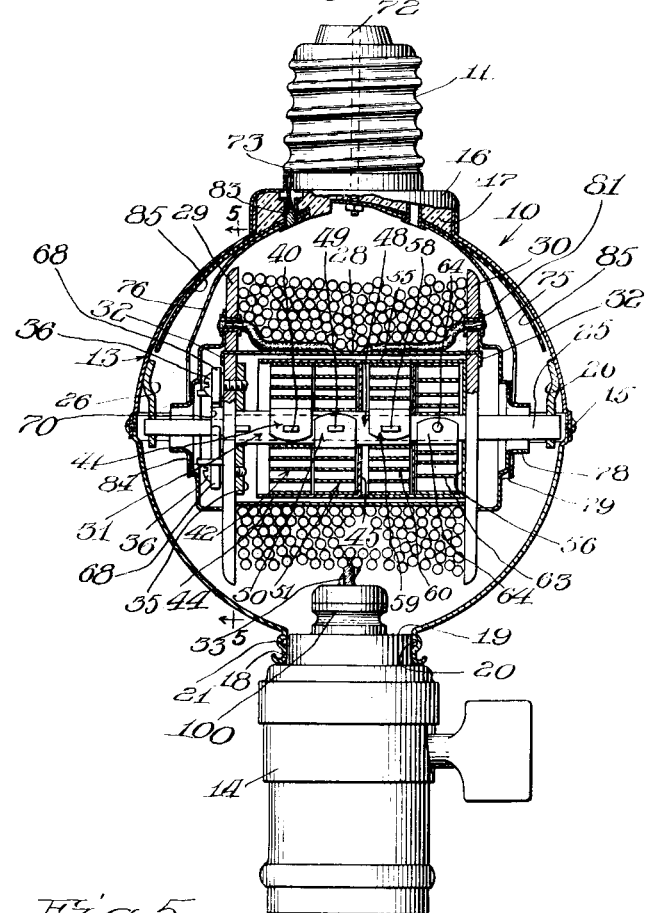
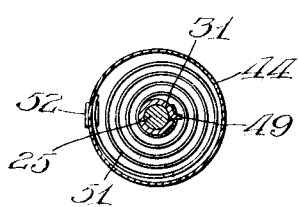
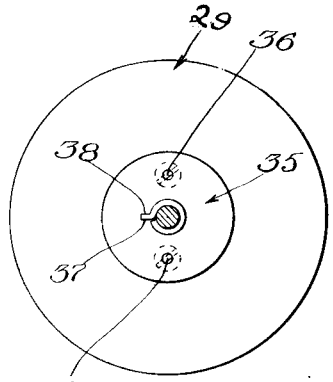
Witnesses:
Harry S Gaither
J. E. Dowl.
Inventor:
Ernst G. K. Anderson
by William W. Hace
Atty.

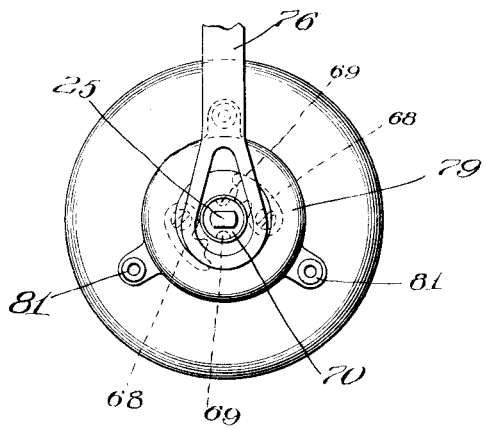
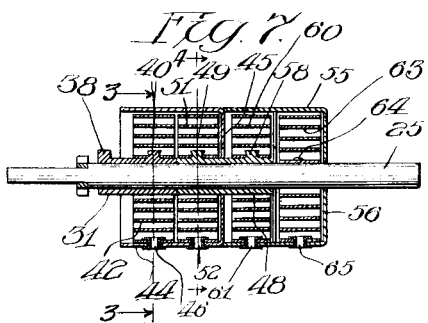
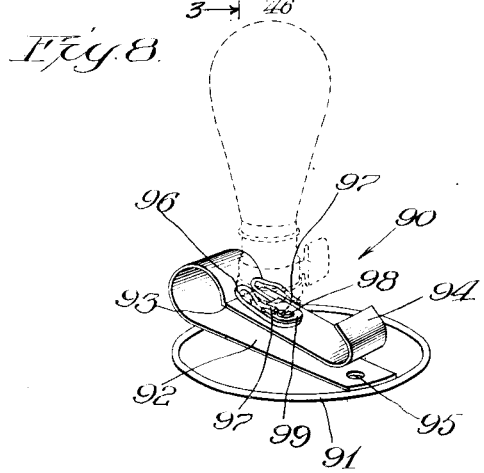

UNITED STATES PATENT OFFICE.

ERNST G. K. ANDERSON, OF CHICAGO, ILLINOIS.

EXTENSION ELECTRICAL FIXTURE.

1,175,498.  Specification of Letters Patent.  Patented Mar. 14, 1916.

Application filed July 13, 1914.  Serial No. 850,630.

*To all whom it may concern:*

Be it known that I, ERNST G. K. ANDERSON, a citizen of the United States, and a resident of Chicago, in the county of Cook and State of Illinois, have invented certain new and useful Improvements in Extension Electrical Fixtures; and I do hereby declare that the following is a full, clear, and exact description thereof, reference being had to the accompanying drawings, and to the characters of reference marked thereon, which form a part of this specification.

This invention relates to a novel extension electrical fixture of that kind embracing a reel about which to wind the fixture conductor cord, and on which the cord is normally contained, the reel being under the control of a spring or springs which are strained when the cord is unwound from the reel and the energy of which serves to rewind the cord on the reel when desired.

My invention may be embodied in extension devices for various kinds of electrical fixtures, such as electric lamp sockets, telephones and the like.

It is shown in the drawings herein as adapted to the socket of an electric light fixture and will be so specifically described, and in some phases so specifically claimed, although the invention is not in all its details limited to such adaptation.

Among the objects of the invention is to provide an exceedingly compact device which may be readily attached to a standard electric light fixture employing the usual shade and which will be sightly.

A further object of the invention is to provide a novel arrangement of springs for rewinding the cord on the reel after it has been extended therefrom.

A further object of the invention is to provide means to interlock the extensible part of the fixture to the fixed part thereof so that the latter is reliably held in fixed depending position from the fixture when not extended in the manner of an ordinary electric lamp.

Other objects of the invention are to improve and simplify constructions of this character, and the invention consists in the matters hereinafter set forth and more particularly pointed out in the appended claims.

In the drawings: Figure 1 is a partial view of an electric lamp fixture showing my invention applied thereto. Fig. 2 is a view partially in elevation and partially in section of the extension fixture. Figs. 3 and 4 are sections taken on the lines 3—3 and 4—4, respectively, of Fig. 7. Fig. 5 is a section on the line 5—5 of Fig. 2. Fig. 6 is a face view of one end of the reel showing the spring controlling device and also portions of the contacts constituting one side of the lamp circuit. Fig. 7 is an axial section of the spring units and their interconnecting parts. Fig. 8 is a perspective view of a convenient form of support for an electric lamp by which the lamp, when extended, may be supported in various positions.

As shown in the drawings, 10 designates my improved fixture, as a whole. It comprises at one end a standard screw-threaded plug 11, a spherical sheet metal casing 13 to contain the elements of the winding reel, and a lamp or other fixture socket 14 arranged at the side of the casing axially opposite the plug 11.

The casing 13 is preferably made of two parts which are fitted together in overlapping engagement at their margins and may be fastened together by screws 15 or other fastening means. The plug 11 has a hollow base 16 which is fitted to the casing over an opening therein and is fastened to the casing in any suitable manner. The said plug base contains an insulating block 17 to which parts of the two sides of the lamp circuit are connected and by which connections between parts of the circuit inside and outside of the casing may be effected.

The socket 14 is inserted into a suitably formed opening in the lower half of the casing 13, the said opening being surrounded by a neck portion 18 within which an extension 19 of the socket closely fits. The extension 19 may be provided with lugs 20 adapted to fit within shallow recesses 21 in the neck portion 18 of the casing to constitute an interlocking releaseable connection between the socket and reel casing; said neck portion being made sufficiently light to enable the parts to be reliably held together by the resiliency of the metal of the neck while permitting ready separation when the socket is pulled away from the casing.

The rewinding reel mechanism contained within the casing is made as follows: 25 designates a non-rotative shaft arranged horizontally within the casing midway between the plug 11 and the socket 14. It is mounted at its ends in brackets 26, 26 which are attached to the inner wall of the upper casing member. As herein shown one end of the shaft 25 is squared or otherwise made angular to fit a correspondingly shaped opening in the associated supporting bracket 26. Mounted to rotate freely on said shaft 25 is a drum which consists of a barrel 28, axially through which the said shaft extends, and end plates or flanges 29, 30 fixed to the barrel. The end plate 30 is directly mounted on the shaft 25 while the end plate 29 is directly mounted on a sleeve 31 that is rotatively mounted on said shaft. The barrel of the reel is provided with end lugs or extensions 32 which extend through openings in said end plates or flanges and may be bent or clenched over the outer faces of said flanges to lock the parts together. Upon this drum the lamp cord 33, connected to the socket 14, is wound, as best shown in Fig. 2. The cord is rewound upon the reel by a rewinding spring device made as follows: The sleeve 31 is non-rotatively connected to the end flange 29 of the reel through the medium of a disk 35 that is fastened by screws 36 to the inner side of said flange or plate and said disk is provided with a central aperture to receive the sleeve 31 and with a radial notch 37 to receive a radial lug 38 of the sleeve 31. Said sleeve is provided with a second lug 40 over which fits the apertured end 41 of a flat helical spring 42 that surrounds said sleeve within a shell or cup 44 which is open at one end and is closed at its other end by a wall 45. The said spring 42 is shown as connected at its other end to said shell 44 by means of a rivet 46. Extending through the wall 45 of the shell 44, and partially into said shell, is a second sleeve 48 that loosely surrounds the shaft 25. This latter sleeve is provided near one end with a lug 49 over which fits the apertured end 50 of a second flat helical spring 51 arranged within the shell 44 between the spring 42 and the end wall 45 of said shell. Said spring 51 is wound reversely to the adjacent spring 42, as indicated in Fig. 2. The sleeve 48 is provided at its other end, and within a second shell 55, having an end wall 56 that is apertured to receive the shaft 25, with a second lug 58 to which one end 59 of a third flat helical spring 60, contained within the casing 55, is attached; the other end of the said spring 60 being attached to the wall of the shell 55 by a rivet 61. The third spring 60 is wound reversely to the adjacent spring 51, as shown in Fig. 2. Located within the shell 55 between the third spring 60 and the end wall 56 of said shell 55 is a fourth flat, helical spring 63 which is attached at its inner end by means of a pin 64 to the shaft 25 and is attached at its other end by means of a rivet 65 to the casing or shell 55. The said fourth spring 63 is wound reversely to the adjacent spring 60. It will thus be seen that the helical springs are arranged in series, being connected by the surrounding cup shaped shells and the sleeves on the shaft, and that one end of one terminal spring is anchored to the shaft by means of the rivet 64 and the opposite end of the other spring is attached to the reel, so that the several interconnected springs arranged side by side constitute, in effect, a single spring of four times the length and winding power of any one of the constituent springs of the series.

The springs are placed under tension when the cord 33 is unwound from the reel, the tightening stress being transmitted through the barrel 28 of the reel and the left hand end plate or flange 29, which latter is interlocked to the first sleeve 31 of the series. From this point the springs, if properly proportioned relatively to each other, will be progressively wound or placed under tension. Whether or not this theoretical proportion occurs will be of little consequence, inasmuch as the total winding of the springs will be equalized regardless of which constituent of the series is first wholly wound. This arrangement provides an exceedingly compact method of assembling the spring which permits of long extension cord being employed, and which serves, after the tension springs are released, to rewind the cord back on the reel within the casing.

Any suitable devices may be employed to lock the springs under tension. I have shown herein a common form of pawl and ratchet mechanism ordinarily employed for controlling the operation of window shade rollers. It consists of two gravity dogs 68, 68 which may be pivoted to the end flange 29 of the reel by means of the screws 36, before referred to, and the biting teeth of which are adapted to engage in notches 69, 69 of a disk 70 that is fixed on the angular end of the shaft 25, as herein shown, just outside of the end flange or plate 29 of the reel.

Current is carried to the two conductors of the cord 33 from the terminals 72, 73 of the plug 11 by the following means: 75, 76 designate light conducting strips which are carried by the insulating block 17 of the plug base. The strip 75 is attached to the central terminal 72 of the plug 11 by having the terminal extend therethrough, as shown in Fig. 2. The said strip 75 extends downwardly from the block 17 within the casing and bears at its lower end against the outer face of a metal conductor cap 79 attached, as by the rivets 81, to the outer face of the adjacent plate or flange 30. As shown the said cap is provided with an axial hub that surrounds but is out of contact with the shaft 25. The conductor strip 75 may be aperturted to fit over said hub. One of the rivets 81 is made hollow to receive the terminal of one of the conductors of the cord 33, as clearly shown in Fig. 2. This side of the circuit is, therefore, established through the terminal 72, the strip 75, the contact cap 79 and one of the conductors of said cord. The other side of the circuit is similarly established through the conductor strip 76 that is connected at 83 to the outer, screw-threaded terminal 73 of the plug and through a conductor cap 84 applied to the adjacent flange or plate 29 of the reel and the other conductor of said cord. Said cap 84 is applied to said end plate or flange 29 in the same manner as the plate or cap 79, and the end of the adjacent conductor strip 76 is apertured to fit over the hub of said cap and bears on the flat outer face of the cap. In order to insulate the said conductor strips 75, 76, from the casing, insulating strips 85 are attached to the block 17 and extend downwardly between the casing wall and said strips, as shown in Fig. 2.

In connection with an extension device of the character described, I have provided a stand or support for the lamp when extended from the casing. This stand or support is designated, as a whole, by 90 and is shown in Figs. 1 and 8. It comprises a base portion 91, of ring form, as herein shown and a spring metal strip that is reversely bent upon itself to constitute the two members 92, 93 of a spring clamp adapted to fit over the edge of a desk leaf or the like. The member 92 of said clamp extends diametrically across the base ring and is soldered or otherwise secured thereto. The member 93 is provided with a curved terminal 94 that constitutes a hook by which the device, with a lamp supported thereon, may be suspended on a bed rail or the like. The member 92 of the clamp is provided with an aperture 95 by which the device may be supported upon a nail extending horizontally from a wall. Attached to the member 93 of the clamp is a lamp receiving clasp designated, as a whole, by 96. It is herein shown as composed of a single wire and is formed by folding the wire upon itself in hair pin fashion, and thereafter folding the terminals 97, 97 toward the closed end of the folded wire, the said terminals constituting the holding elements of the clasp. The said clasp may be fastened to the clamp member 93 by means of a clamping screw 98 and a plate 99 as shown in Fig. 8. The extension 19 of the socket 14 is provided with an under-cut neck portion 100 that is adapted to be passed into and between the clasp arms 97, 97, as clearly shown in Fig. 8, and the resiliency of said arms holds the socket in place. The ends of the said arms are flared outwardly to permit the socket neck to be readily inserted therebetween, and they are preferably oppositely curved to reliably grasp the neck, so that the lamp is firmly interlocked to the holder to be held in a desired position regardless of its angle to the support.

It will be understood that the structural details herein shown are subject to variations within the scope of the claims hereto appended.

The means shown for connecting the springs in series is simple and efficient, but other means may be employed with the type of springs herein shown or with other types of springs.

I claim as my invention:—

1. An extension electrical fixture comprising in combination with a casing provided with a plug and lamp support, a cord for connecting the fixture to a source of current, a reel on which the cord is wound, a fixed shaft within the casing on which the reel is rotatively mounted, and a rewinding reel is rotatively mounted, and a rewinding spring device for said reel comprising a series of flat helical springs arranged side by side and interconnected to constitute a continuous spring, and with adjacent helices wound in opposite directions from one end of the series to the other, one end of one terminal helix being attached to said reel and one end of the other terminal helix being attached to said shaft.

2. An extension device for electrical fixtures comprising a casing provided at one side with a plug and at its opposite side with a socket adapted to receive the base of a depending lamp, a cord reel within the casing, a fixed shaft on which said reel is rotatively mounted, said shaft extending beyond the reel and engaging at both ends fixed supports within the casing, a cord wound on said reel and adapted to be connected to the lamp base and a rewinding spring device for the reel comprising a series of interconnected progressively acting spring units, with adjacent units reversely wound, and the unit at one end of the series fixed to the shaft and the unit at the other end of the series fixed to the reel, substantially as described.

3. An extension device for electrical fixtures comprising a casing provided at one side with a plug and at its opposite side with a socket to receive the base of a depending lamp, a cord reel within the casing, a fixed shaft on which said reel is rotatively mounted, said shaft extending beyond the reel and engaging at both ends fixed supports within the casing, a cord wound on said reel and adapted to be connected to the lamp base, current conducting members carried by the opposite ends of the reel concentric to the axis of rotation thereof and connected one to each conductor of the cord, conductor strips connected to the terminal elements of the plug and bearing against said conducting members, and a rewinding spring device for the reel comprising a series of interconnected progressively acting spring units, with adjacent units reversely wound, and with the unit at one end of the series fixed to the shaft and the unit at the other end of the series fixed to the reel, substantially as described.

4. An extension device for electric fixtures comprising a casing provided at one end with a fixed plug adapted for connection to a socket and provided at its other end with a neck to receive the base of a lamp, and with means to detachably interlock it to said base to thereby support said lamp, a fixed shaft within and extending transversely across the casing between said plug and neck, a pawl and ratchet controlled cord reel rotatively mounted on said shaft a cord windable upon the reel and attached at one end to said base, electrical contacts at the ends of said reel, conducting fingers to connect said plug with said contacts and a rewinding spring device within the drum attached to said shaft and to said drum.

5. An extension device for electrical fixtures comprising a casing provided with a plug and a lamp support, a cord reel within said casing, a fixed shaft within the casing on which the reel is rotatively mounted, with a cord connected to the terminals of the plug and adapted to be attached to a lamp base and windable on said reel, and a reel rewinding spring device comprising casings rotatively mounted on the shaft, sleeves rotatively mounted on the shaft within said casings, one of which is locked to said reel and a series of helical springs within said casing and surrounding said sleeves, with adjacent helices wound in opposite directions throughout the series, said springs being attached at their outer ends to the casing walls and one of said springs being attached at its inner end to said shaft while the other springs are attached at their inner ends to said sleeves.

6. In an extension device for electrical fixtures, a cord rewinding device comprising a fixed shaft, a reel rotatively mounted thereon and a rewinding spring device for the reel comprising a plurality of casings having end walls rotative on said shaft and cylindric walls, a plurality of sleeves rotatively mounted on said shaft one of which is locked to the reel, a series of reversely wound helical springs within the casings, the outer ends of said springs being attached to the casing and the inner ends of all but one of the springs being attached to the sleeves, the latter spring being attached to the shaft.

7. A fixture having a casing comprising two interconnected sections, a circuit forming plug formed on one of the said sections, the other having an opening, a drum rotatably mounted upon a shaft supported within one of said sections, a plurality of interconnected springs disposed upon said shaft, one of the outermost springs having its inner end connected to said shaft, the other outermost spring having its inner end connected to said drum, whereby a gradual rewinding of the latter may be procured, electrical contacts disposed at the extremities of said drum, resilient fingers operatively connecting said contacts with said plug, an electrical socket formed with a member adapted to project within the opening in said casing, conductors carried by said socket having their free ends connected with the contacts on said drum, and coöperating means on said shaft and drum to prevent winding on the part of the latter.

8. A fixture comprising a casing composed of two interconnected sections, a circuit forming plug rising from one of said sections, the other casing section having an opening forming a seat to receive an electrical socket, a shaft in one of said casing sections, a spring actuated drum revolubly supported upon said shaft, electrical contacts disposed upon opposite ends of said drum, resilient fingers connecting said contacts with said plug, an electrical socket having a part adapted to project within said seat, and conductors connected with the said socket and with the contacts on said drum and windable about the drum.

9. A fixture comprising a casing composed of two interconnected sections, a circuit forming member rigid with and rising from one of said sections for engagement with an electrical socket, the other casing section having an opening formed diametrically opposite to and axially alined with said plug and forming a seat for an electrical socket, a shaft in one of said casing sections, a spring actuated drum revolubly supported upon said shaft, electrical contacts disposed upon opposite ends of said drum, inwardly bowed resilient fingers connecting said contacts with said plug, an electrical socket having a part adapted to project into said seat and to be supported therein and conductors connected with said socket and with the contacts on said drum and windable about the drum.

10. A fixture comprising a casing composed of two interconnected sections, a circuit forming plug rigid with and extending from one of said sections for engagement with an electrical socket, the other casing section having an opening disposed diametrically opposite to said plug and forming a seat for an electrical socket, a shaft within one of said casing sections, a drum revolubly mounted on said shaft and a plurality of interconnected springs disposed upon said shaft, the end of one of said springs being connected to said shaft, and the end of the other spring being connected to the said drum, whereby to produce a gradual rewinding of the latter, electrical contacts disposed upon the opposite ends of the drum, resilient fingers connecting said contacts with said plug, an electrical socket having a part adapted to project within said seat and conductors connected with said socket and with the contacts on said drum and windable about the drum.

11. A fixture having a casing comprising interconnected sections, a plug formed on one of the latter, the other having therein an opening, a shaft disposed within the casing, a spring actuated winding member rotatably mounted upon said shaft and including a pair of spaced heads, a supplemental casing disposed between and connected to said heads, a pair of contiguously mounted drums inclosed by said supplemental casing, forming spring compartments, springs in said compartments, the outer ends of the respective springs being connected to said drums, a sleeve connecting the inner ends of the innermost springs, the inner end of one of the outermost springs being connected to the shaft, the inner end of the other outermost spring being connected to one of said heads, whereby a gradual rewinding of said winding member may be procured, metal caps disposed upon the extremities of said winding member, fingers operatively connecting said cap with said plug, an electrical socket having a member adapted to project within the opening in said casing, conductors carried by said socket and connected with said metal caps, and coöperating means on said shaft and one of said heads to prevent winding on the part of said drum, substantially as and for the purpose set forth.

12. A fixture having a casing, the latter including interconnected sections, a plug formed on one of the latter, the other having therein an opening, a shaft disposed within said casing, a spring actuated winding member rotatably mounted on said shaft and including a pair of drums contiguously mounted, forming spring compartments, four springs to actuate said winding member, disposed in said compartments, a sleeve disposed upon said shaft and connecting the inner ends of two intermediate springs, the other ends thereof being connected to said drums, a winding plate disposed upon said shaft, a sleeve carried by said plate and projecting into one of said spring compartments, the end spring disposed in the latter having one end connected to said drum, the other to said sleeve, the end spring in the other compartment having its inner end connected to said shaft and its outer end connected to said drum, a supplemental casing for said drum, heads operatively connected with said supplemental casing, one of said heads also having a connection with said winding plate, whereby a gradual rewinding of said winding member may be procured, contacts disposed upon said heads, resilient fingers connecting said contacts with said plug, an electric light socket engaged with the opening in said casing, conductors engaged with said socket and having their free ends connected with said plates, and coöperating means on said shaft and drum to prevent winding of the drum, substantially as and for the purpose set forth.

13. A spring actuated winding member comprising supporting standards, a shaft rigidly supported thereby, a pair of heads disposed upon said shaft, a supplemental casing disposed between and connected to said heads, a pair of drums contiguously disposed upon said shaft, providing spring compartments, springs situated in said compartments, the outer ends of said springs being connected to said drums and a sleeve connecting the inner ends of the innermost springs, the inner end of one of the outermost springs being connected to said shaft, and the inner end of the other outermost spring being connected to one of said heads, whereby a gradual rewinding of said winding member may be procured, substantially as and for the purpose set forth.

In testimony, that I claim the foregoing as my invention I affix my signature in the presence of two witnesses, this 8th day of July, A. D. 1914.

ERNST G. K. ANDERSON.

Witnesses:
  G. E. Dowle,
  W. L. Hall.